June 11, 1968
G. E. HALL ET AL
3,387,485
BEARING TESTER
Filed Jan. 12, 1967
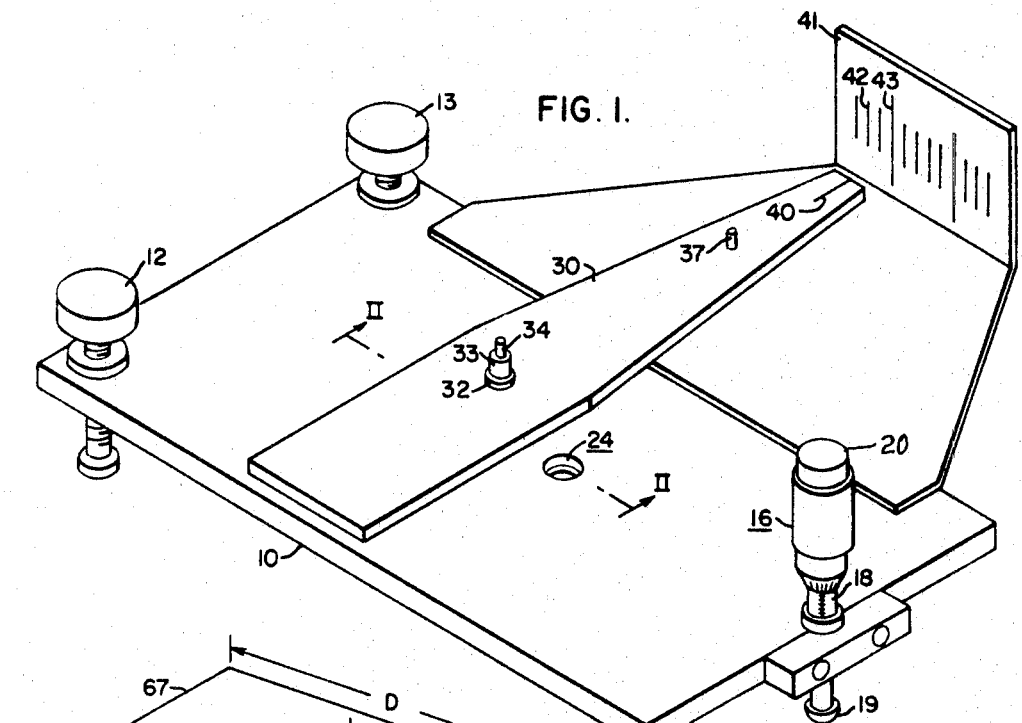
FIG. 1.
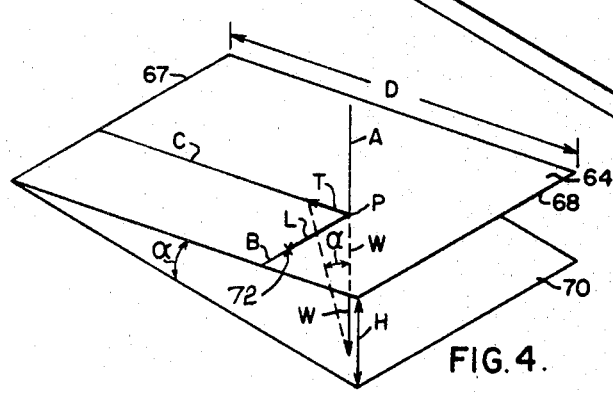
FIG. 4.
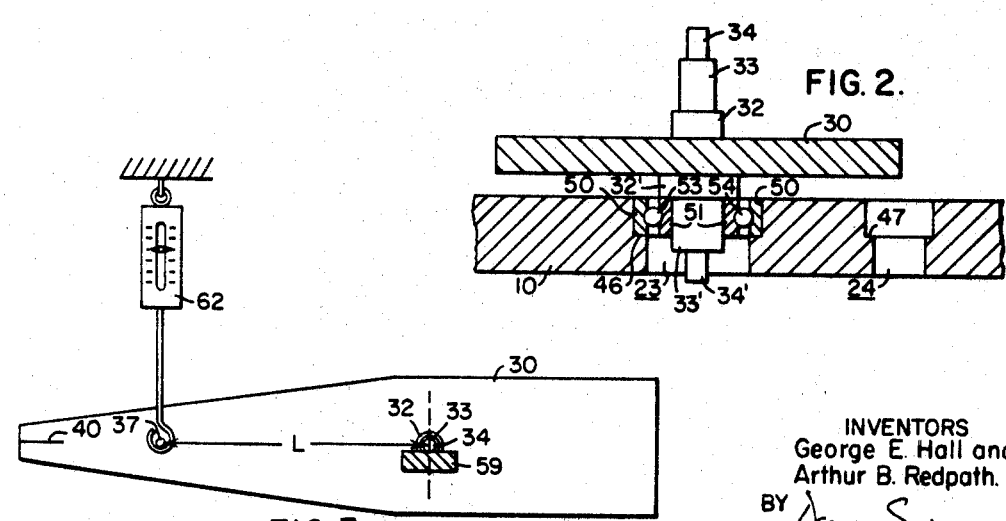
FIG. 2.
FIG. 3.
INVENTORS
George E. Hall and
Arthur B. Redpath.
BY
ATTORNEY

United States Patent Office 3,387,485
Patented June 11, 1968

3,387,485
BEARING TESTER
George E. Hall, Harmans, and Arthur B. Redpath, Beltsville, Md., assignors to Westinghouse Electric Corporation, Pittsburgh, Pa., a corporation of Pennsylvania
Filed Jan. 12, 1967, Ser. No. 608,905
12 Claims. (Cl. 73—9)

ABSTRACT OF THE DISCLOSURE

A flat plate is initially adjusted to a horizontal position and receives a bearing to be tested. A torque arm, precalibrated with respect to effective weight, has a hub portion which is inserted into the central opening of the bearing. For a qualitative test the arm is gently moved to see if there are any abrupt changes in smooth rotation. For a quantitative test the plate is tipped by means of a micrometer head attached at one end of the plate and when the torque arm rotates under force of gravity a reading is noted indicative of the height of the end above or below its initial position. From the reading and a knowledge of the location of the effective weight, starting torque is obtained.

---

In gyroscopic gimbal arrangements, use is made of bearings, such as ball bearings, so that the apparatus may respond to extremely slow motions in one or more coordinate directions. The bearings usually include an outer race, an inner race having a central aperture, and a series of balls or rollers interposed between the outer and inner races.

The bearings are tested for their intended use by attaching a transducer to the inner race, and by means of a machine, the inner race is spun relative to the outer race. The transducer is connected to some sort of a recorder such as a paper tape recorder which provides a graphic representation of abrupt changes in rotation due to noise, roughness, imperfections or other factors. The graphic representation is then examined ob obtain a factor of running torque as well as an extrapolation from the running torque to obtain a probable starting torque, that is the torque necessary to initially move the inner race relative to the outer race. In many situations, this rough estimate of starting torque is satisfactory for the intended purpose of the apparatus. However, in many systems, for example in an inertial navigation system, a miscalculation or an erroneous value for starting torque can represent a significant error in the system even to the effect of completely throwing the system off its predetermined course.

It is, therefore, a primary object of the present invention to provide a bearing torque tester which will accurately indicate starting torques, and maximum value of running torques at extremely low running speeds of the bearing.

Another object is to provide a bearing torque tester which is of relatively simple construction.

Another object is to provide a bearing torque tester which is simple to operate.

In addition to an incorrect starting torque affecting precise operation of a system, it is also possible that a defective bearing will significantly contribute to inefficient operation. Such defects such as dirt in the bearing, defective races or balls, defective dust shields where utilized, are very often and sometimes impossible to detect from the prior art method of dynamic testing of bearings.

It is, therefore, another object of the present invention to provide a bearing tester which will give an indication of an imperfect or improperly manufactured bearing.

Summary of the invention

Briefly, in accordance with the above objects, the bearing tester of the present invention includes means in the form of a flat plate forming a reference plane, initially adjusted to a horizontal position. One or more receptacles are provided in the plate for receiving a ball bearing to be tested. A second major component of the bearing tester takes the form of a torque arm having a projection which is inserted into the central opening of the bearing under test. The torque arm is so designed that an effective force W acts at a precalculated distance L from the insertion point of the bearing.

With the torque arm inserted into the bearing, and the plate in a horizontal orientation, a slight movement may be imparted to the torque arm for visually inspecting the movement thereof in order to detect irregularities or abnormalities in the bearing under test.

In order to test the bearing for starting torque, means are provided for changing the angular orientation of the plate from its horizontal position until such time that the torque arm starts to move. At that point with a knowledge of the effective weight W, the distance L, and the angular orientation, the starting torque may be obtained and means are provided to give an indication of the angular orientation, or the starting torque or other related readings.

The above stated as well as further objects, uses and advantages of the present invention will become apparent upon a reading of the detailed specification.

Brief description of the drawings

FIGURE 1 illustrates a perspective view of one embodiment of the present invention;

FIG. 2 illustrates a view along the line II—II of FIG. 1;

FIG. 3 illustrates the effective placement of a weight W at a known distance along the torque arm of FIG. 1; and FIG. 4 diagrammatically illustrates the development of the starting torque equation and its relation to several variables.

Description of the preferred embodiment

Referring now to FIG. 1, these is illustrated a bearing tester including a plate 10 defining a reference plane. Adjusting means for initially adjusting the plate 10 to a horizontal orientation include a pair of jackscrews 12 and 13 at one end of the plate and the initial horizontal adjustment is completed with the provision of a manually operated vernier screw arrangement in the form of micrometer head 16 which also serves to change the angular orientation of the plate 10 with respect to its initial horizontal position.

Basically, the micrometer head 16 includes a sleeve 18 with indicia thereon, a spindle 19 and a thimble portion 20 for raising or lowering the spindle portion when the thimble portion 20 is rotated.

The plate 10 includes receptacles 23 and 24 (of which only receptacle 24 may be seen in FIG. 1) each being for receipt of a different size ball bearing to be tested. For the testing of bearings of only one size, only one receptacle need be provided. If a plurality of different size bearings are to be tested, it is possible to provide a single aperture in the plate 10 for receipt of different sockets, with each socket being uniquely adapted to receive a respective bearing to be tested.

A torque arm 30 has projection means for insertion into the central opening of a bearing under test. For the case where two different size bearings may be tested, as in FIG. 1, the torque arm 30 may include in addition to a first projection means (unobservable in FIG. 1 and illustrated in FIG. 2) a second arrangement including a spacer cylinder 32, an insertion cylinder 33, and a projection 34 for balancing purposes to be described.

When a second size bearing is to be tested, it is placed into the receptacle 24 and the torque arm 30 may be turned over such that the insertion cylinder 33 is placed into the central opening of the bearing in the receptacle 24.

A pin 37 serves to define the location of an effective precalculated weight W at a known distance from the center of the bearing under test and it will be described in more detail with respect to FIG. 3.

Prior to testing the bearing for starting torque, it is desirable to perform a qualitative analysis to determine if the bearing is defective in any manner. This may be accomplished by placing the projection of the torque arm 30 into the bearing, after which the torque arm 30 may be gently tapped to impart a rotary motion thereto. If there is any defect in the bearing, such as imperfections or dirt, the torque arm 30 will not rotate smoothly but will change its motion abruptly and in some cases will even cease to rotate. If a gentle initial rotation is imparted to the torque arm 30 and there is no cessation or abrupt there is any defect in the bearing, such as imperfections or changes in rotation, the torque arm may be removed and reinserted at a different location or the bearing may be turned over for another qualitative test. The torque arm 30 includes a pointer indicator 40 for initially positioning the arm prior to a starting torque test. For this purpose a scale 41 includes indicia 42 thereon and by way of example the pointer indicator may be positioned opposite line 43 of the indicia to insure a correct orientation. Before proceeding with an explanation of the quantitative starting torque test, reference should be made to FIG. 2 which illustrates a view along the lines II—II of FIG. 1.

The receptacles 23 and 24 each includes a shoulder portion 46 and 47 respectively, upon which a bearing under test rests. The bearing in receptacle 23 includes an outer race portion 50, an inner race portion 51 separated by balls 53 and 54.

The underside of the torque arm 30 may include a plurality of cylinders forming a hub as on the top side, and accordingly correspondingly similar parts have been designated with prime reference numerals. The insertion cylinder 33' fits in the central opening of the ball bearing and the spacer cylinder 32' insures that the torque arm 30 does not bear on the ball bearing or the plate 10. Since for proper operation the torque arm 30 may be at any reasonable height above the plate 10, it is possible to modify the insertion portions of the hub so that the lower portion has an arrangement or different diameter cylinders for insertion into the different size bearings.

It has been stated that an effective weight W is located at a certain distance from the center of the bearing under test. FIG. 3 illustrates how this effective weight may be positioned. In FIG. 3 the torque arm 30 is placed upon its side with the projection 34 resting on a knife edge 59. The correspondingly opposite projection 34' also rests on a knife edge on the other side of the torque arm 30. Initially, the torque arm may be weighted or designed such that in the absence of any holding force the torque arm 30 will rotate counterclockwise to a vertical position. A distance L is chosen for the placement of the effective weight W, with the distance L being the distance from the central axis of the projection 34 to the pin 37. Indicating means, simply illustrated as a scale 62, may be operably connected with the pin 37, and weights may be added (to the right of the dotted line) until the scale reads the predetermined weight W.

By way of explanation, if the torque arm is now inserted into a bearing and the plate 10 (FIG. 1) is horizontal, the force or weight W will be acting perpendicular to the plate 10 and no turning torque will be exerted on the bearing. At the other extreme, if the plate were tipped up on its end, for example the jackscrew end, a torque would be exerted on the bearing and would be equal to the weight W times the torque arm L. Intermediate between these two extremes, a torque will be exerted upon the bearing as the angular orientation of the plate 10 from initial horizontal position is charged, and the torque may have a value from zero to WL, depending upon the angular orientation. In most instances, the torque arm 30 will commence to move after the plate 10 has been tipped by a relatively small degree.

FIG. 4 serves to demonstrate how a value of a starting torque may be obtained. In FIG. 4, reference plane 64 represents the plate 10 of FIG. 1. Line 67 represents a line passing through jackscrews 12 and 13 and substantially about which the reference plane is pivotable, and line 68 represents a line parallel to 67 and passing through the center of micrometer head 16 which is therefore spaced from the line 67. The perpendicular distance between lines 67 and 68 is D and the initial horizontal plane is represented by the the numeral 70. The angle $\alpha$ which the reference plane 64 makes with the initial horizontal plane 70 is the point at which the torque arm 30 commences movement. The height of the reference plane 64 above the initial horizontal plane 70 is H.

Three coordinate lines A, B and C are illustrated with the coordinate lines B and C lying in the reference plane 64 and coordinate line A being a line perpendicular to plane 70. The three coordinate lines A, B and C meet at a point P, at which point is located the effective weight W as represented by the vector labeled W. Point 72 located between lines 67 and 68 represents the center of the bearing under test and the distance from point P to 72 is the distance L. The weight vector W has a component T lying along the C coordinate axis and from vector and geometric considerations it may be shown that $$T = W \sin \alpha$$

Torque $\tau$ on the bearing may be expressed as:

$$\tau = LT$$

since $$T = W \sin \alpha$$

$$\tau = LW \sin \alpha$$

The sin $\alpha$ term however is also equal to $H/D$, therefore $$\tau = \frac{LW}{D} H$$

since L is known, W is known, and D is known, the torque $\tau$ at which the torque arm 30 commences to move is directly proportional to the height H of line 68 above the plane 70 and this value may be obtained directly from the micrometer reading. Conversion charts may be provided in order to correlate the micrometer reading with a specific torque or, if desired, the micrometer or a similar arrangement may be provided which is directly readable in torque units. Since extremely low speed running torque is never greater than the starting torque, a maximum value for low speed running torque is therefore obtained when the starting torque value is determined. FIG. 4 shows the reference plane 64 above the initial horizontal plane 70; the analysis of FIG. 4 also applies where a micrometer movement is in the opposite direction such that the reference plane 64 is below the initial horizontal plane 70.

Accordingly, there has been provided a relatively simple and rugged device capable of testing one or a plurality of different size bearings for providing a quantitative result in terms of starting torque and extremely low speed maximum running torque, in addition to a qualitative result which indicates probable defects in the bearing under test.

Although the present invention has been described with a certain degree of particularity, it should be understood that the present disclosure has been made by way of example and that modifications and variations of the structure, arrangement and design of the embodiment set forth are made possible in the light of the above teachings.

What is claimed is:

1. A bearing torque tester comprising:
   (A) first means forming a reference plane;
   (B) adjusting means for initially adjusting said reference plane to a horizontal orientation;
   (C) said first means including receptacle means for receipt of a bearing under test;
   (D) a torque arm having a projection for insertion into the central opening of said bearing under test;
   (E) means for changing the angular orientation of said reference plane from said horizontal orientation whereby a point is reached wherein said torque arm will commence to rotate under force of gravity; and
   (F) means for providing an indication of said angular orientation.

2. Apparatus according to claim 1 wherein
   (A) the torque arm has a precalculated effective weight W at a known point P at a distance L from the center of the bearing under test such that said torque arm is capable of imparting a miximum torque of LW to said bearing.

3. Apparatus according to claim 1 wherein
   (A) the first means is a flat plate member;
   (B) the adjusting means includes a pair of adjusting screws at one end of said plate.

4. Apparatus according to claim 1 wherein
   (A) the first means includes at least two receptacles each for receipt of a different size bearing to be tested.

5. Apparatus according to claim 4 wherein
   (A) the torque arm includes a plurality of projections each for insertion into a respective different size bearing.

6. Apparatus according to claim 5 wherein
   (A) the torque arm has a top and bottom surface; and
   (B) each said surface includes at least one of the projections.

7. Apparatus according to claim 1 wherein
   (A) the first means has associated therewith, a line about which said first means is pivotable; and wherein
   (B) the means for changing the angular orientation of the first means acts at a point spaced from said line to effect a pivoting of the first means about said line.

8. Apparatus according to claim 7 wherein
   (A) the receptacle means is located between the line and the point.

9. Apparatus according to claim 7 wherein
   (A) the means for changing the angular orientation is operable to both increase and decrease the height of said point relative to said line.

10. Apparatus according to claim 1 wherein
    (A) the means for changing the angular orientation includes a manually operated vernier screw arrangement.

11. Apparatus according to claim 1 which additionally includes:
    (A) a scale means having indicia thereon;
    (B) the torque arm having a pointer indicator thereon for positioning opposite said indicia to initially position said torque arm.

12. Apparatus according to claim 10 wherein
    (A) the means for providing an indication of the angular orientation includes a calibrated scale on the manually operated vernier screw arrangement.

References Cited

UNITED STATES PATENTS

| | | | |
|---|---|---|---|
| 2,887,875 | 5/1959 | Curriston | 73—9 |
| 3,153,925 | 10/1964 | Snoeyenbos et al. | 73—9 |

LOUIS R. PRINCE, *Primary Examiner.*

J. NOLTON, *Assistant Examiner.*